United States Patent
Aldama et al.

(10) Patent No.: US 12,282,766 B2
(45) Date of Patent: Apr. 22, 2025

(54) SOFTWARE COMPOSITION ANALYSIS ON TARGET SOURCE CODE

(71) Applicant: Snyk Sweden AB, Stockholm (SE)

(72) Inventors: Jon Aldama, Malmö (SE); Daniel Åkerud, Staffanstorp (SE)

(73) Assignee: Snyk Sweded AB, Stockholm (SE)

( * ) Notice: Subject to any disclaimer, the term of this patent is extended or adjusted under 35 U.S.C. 154(b) by 0 days.

(21) Appl. No.: 18/282,486

(22) PCT Filed: Mar. 18, 2022

(86) PCT No.: PCT/EP2022/057228
§ 371 (c)(1),
(2) Date: Sep. 15, 2023

(87) PCT Pub. No.: WO2022/195103
PCT Pub. Date: Sep. 22, 2022

(65) Prior Publication Data
US 2024/0134636 A1    Apr. 25, 2024
US 2024/0231808 A9    Jul. 11, 2024

Related U.S. Application Data

(63) Continuation of application No. 17/207,238, filed on Mar. 19, 2021, now abandoned.

(51) Int. Cl.
*G06F 8/71* (2018.01)
*G06F 8/51* (2018.01)
*G06F 21/57* (2013.01)

(52) U.S. Cl.
CPC .................. *G06F 8/71* (2013.01); *G06F 8/51* (2013.01); *G06F 21/577* (2013.01)

(58) Field of Classification Search
CPC ............. G06F 8/71; G06F 8/51; G06F 21/577
See application file for complete search history.

(56) References Cited

U.S. PATENT DOCUMENTS 7,565,410 B2 * 7/2009 Stickler ............... H04L 61/4552
709/240
8,307,351 B2 * 11/2012 Weigert ................ G06F 21/105
717/142

(Continued)

FOREIGN PATENT DOCUMENTS

WO       2022/195103 A1     9/2022

OTHER PUBLICATIONS

International Search Report and Written Opinion for PCT/EP2022/057228, dated Sep. 8, 2022.

*Primary Examiner* — Douglas M Slachta
(74) *Attorney, Agent, or Firm* — Hamilton, Brook, Smith & Reynolds, P.C.

(57) ABSTRACT

Embodiments perform software composition analysis of target source code. A first exploration process searches first software archives for first occurrences of the target source code among source code files, and for every found first occurrence of the target source code, collects a first set of information about matching source code files or snippets therein. A second exploration process searches second software archives (different from the first plurality of archives) for second occurrences of the target source code among source code snippets, and for every found second occurrence of the target source code, collects a second set of information about matching source code snippets. Each matching source code snippet among the matching source code snippets as collected in the second set of information is mapped to the matching source code files or snippets therein as collected in the first set of information. A software composition is determined based on the mapping.

17 Claims, 9 Drawing Sheets

(56) References Cited

U.S. PATENT DOCUMENTS

| | | | | |
|---|---|---|---|---|
| 8,359,655 | B1* | 1/2013 | Pham | G06F 21/10 |
| | | | | 717/121 |
| 8,688,676 | B2* | 4/2014 | Rush | G06F 16/907 |
| | | | | 707/706 |
| 9,274,803 | B2* | 3/2016 | De Meno | G06Q 10/107 |
| 10,936,225 | B1* | 3/2021 | Eddey | G06F 3/065 |
| 11,099,842 | B2 | 8/2021 | Alomari | |
| 11,500,990 | B2* | 11/2022 | Åkerud | G06F 16/24578 |
| 11,836,486 | B2* | 12/2023 | Lee | G06F 21/10 |
| 2010/0198843 | A1* | 8/2010 | Sirota | G06F 8/60 |
| | | | | 707/754 |
| 2010/0242028 | A1* | 9/2010 | Weigert | G06F 21/105 |
| | | | | 717/131 |
| 2013/0067449 | A1* | 3/2013 | Sannidhanam | G06F 8/60 |
| | | | | 717/170 |
| 2016/0140141 | A1* | 5/2016 | Darcy | H04L 67/1023 |
| | | | | 707/827 |
| 2017/0011058 | A1* | 1/2017 | Gheith | G06F 3/0608 |
| 2017/0109137 | A1* | 4/2017 | Subramanian | G06F 8/30 |
| 2017/0286095 | A1* | 10/2017 | Grabska | G06F 8/61 |
| 2017/0357486 | A1* | 12/2017 | DeLuca | G06F 8/30 |
| 2019/0278931 | A1* | 9/2019 | Tobias | G06F 30/35 |
| 2020/0082078 | A1* | 3/2020 | Boulton | G06F 8/77 |
| 2020/0218535 | A1 | 7/2020 | Alomari | |
| 2020/0304574 | A1* | 9/2020 | Gupta | G06F 3/0605 |
| 2020/0394588 | A1* | 12/2020 | Sanchez | G06F 8/75 |
| 2022/0300277 | A1 | 9/2022 | Aldama et al. | |

\* cited by examiner

SOFTWARE COMPOSITION ANALYSIS ON TARGET SOURCE CODE

This application is the U.S. National Stage of International Application No. PCT/EP2022/057228, filed on Mar. 18, 2022, which designates the U.S., published in English, and is a continuation of U.S. application Ser. No. 17/207,238, filed on Mar. 19, 2021. The entire teachings of the above applications are incorporated herein by reference.

TECHNICAL FIELD

The present invention generally relates to computer systems and software. More specifically, the present invention relates to technical provisions for performing software composition analysis on source code.

BACKGROUND

Computer systems are used virtually everywhere in modern society. As is well known, a general computer system comprises at least one processing device which is configured to execute at least one computer program being defined by at least one source code. The source code defines computer program code instructions, that may be run by the processing device to perform certain intended functionality. Source code can exist and operate in a multitude of different languages, formats, syntaxes, semantics, varieties and types, and is typically produced and interpreted by human persons, machines, robots, computers, compilers and/or assemblers, automatically or manually.

Software Composition Analysis (SCA) involves automated techniques and processes for managing open source components comprised in the software source code. One of the primary objectives of SCA is to assess a program's operational stability in terms of risk management, security and license compliance, so as to protect individuals, companies or enterprises from software vulnerabilities and license violation liabilities. Software vulnerabilities and toxic code snippets are being discovered and recorded, both constantly and massively, in global software archives. When a vulnerability is found in an application or a software library, the authors of the code are typically responsible for having well-defined processes to share the relevant information to anyone importing and operating on this code. This information needs to be shared immediately, since it may affect critical security flaws of the code. If a code snippet has been imported from a third party source, this source is not necessarily obliged to share the relevant information, and is much less likely to have a well-defined process for communicating information to code importers. Additionally, outdated and license-violating online code clones are much less likely to be communicated.

As source code in effect controls the behavior of computer systems, it is of paramount importance that it contains the correct computer program code instructions. SCA can be performed by using a combination of different exploration, reconnaissance, scanning, crawling or tracking tools, so that the components comprised in the source code can be analysed with respect to global and massive software archives, repositories, databases and/or other online Internet sources. Considering the latest years' uprise in Big Data and thus an increasing data growth rate, performing SCA can be very difficult in terms of technical considerations such as computing power and memory requirements.

Current state of the art comprises some techniques for performing SCA on a target source code with respect to the most commonly known open source code archives, such as GitHub. The present inventors have, however, discovered several increasingly problematic situations wherein target source code or snippets emerge from Internet-based community-driven platforms, such as StackOverflow. Such websites are typically used as Q&A forums for users to share code, help each other solve problems, and/or conduct code discussions. As a result, a plurality of original code snippets is constantly being reproduced and linked to different authors on one or more platforms.

It is currently not known in the art how to include such community-driven platforms when performing SCA on a target source code. Moreover, there are also problems involving not knowing if source code snippets are originally produced on Internet-based community-driven platforms or open source code archives. Consequently, there are currently no existing techniques for credibly performing SCA on a target source code without potentially jeopardizing the computer security of entire systems, modules, programs, snippets, or parts thereof.

After insightful reasoning, the present inventors have identified an approach of performing SCA that, in an extremely efficient, accurate and credible manner, enables the opportunity of including Internet-based community-driven websites in SCA.

SUMMARY

It is accordingly an object of the invention to eliminate or alleviate at least some of the problems or drawbacks referred to above.

In a first aspect, a computer-implemented method for performing software composition analysis of a target source code for a computer program or a part thereof is provided. The method involves performing a first exploration process. The first exploration process comprises searching a plurality of first software archives originating from different sources in a global computer network to find first occurrences of the target source code among source code files in the plurality of first software archives. The first exploration process further comprises, for every found first occurrence of the target source code, collecting a first set of key information about matching source code files or snippets therein. The method further involves performing a second exploration process. The second exploration process comprises searching a plurality of second software archives originating from one or more sources in the global computer network, the plurality of second software archives being different from the plurality of first software archives, to find second occurrences of the target source code among source code snippets in the second software archives. The second exploration process further comprises, for every found second occurrence of the target source code, collecting a second set of key information about matching source code snippets. The method further involves mapping each matching source code snippet among the matching source code snippets as collected in the second set of key information to the matching source code files or snippets therein as collected in the first set of key information, wherein the mapping indicates whether an earlier version of said each matching source code snippet exists in the first set of key information. The method further involves, based on the mapped first set of key information and second set of key information, determining a software composition of the target source code.

According to one embodiment, if an earlier version of said matching source code snippet exists in the first set of key information, the mapping further involves filtering said matching source code snippet from the second set of key information.

According to one embodiment, the filtering involves discarding, removing, hiding and/or down ranking said matching source code snippet from or in the second set of key information.

According to one embodiment, the software composition is indicative of origins, licenses, versions, vulnerabilities, comments, repositories, authors, file sizes, snippet sizes and/or resource locations associated with the target source code.

According to one embodiment, the plurality of first software archives are open source code archives.

According to one embodiment, the plurality of second software archives are Internet-based community-driven platform archives.

According to one embodiment, the plurality of first software archives and/or second software archives is any combination of open source code archives or Internet-based community-driven platform archives.

According to one embodiment, the open source code archives are one of or a combination of Github, Gitlab, or Bitbucket archives.

According to one embodiment, the Internet-based community-driven platform archives are one of or a combination of StackOverflow or other StackExchange platforms, Coderanch, Quora, Reddit, Google Groups, SitePoint, CodeProject, Google+Communities, Treehouse, Hacker News, DZone, Bytes, DaniWeb, Dream.In.Code, Pineapple, Lobsters, XDA Developers, CodeGuru, Programmers Heaven, FindNerd, Designers Talk, Hashnode or Mozzila Web Developer Community archives.

According to one embodiment, the method further involves creating a virtual file tree of the software composition of the target source code.

According to one embodiment, the method further involves an initial step of receiving a request for performing software composition analysis of the target source code.

According to one embodiment, the method further involves compiling the software composition into a software composition analysis report, and returning said report.

According to one embodiment, the first set of key information comprises one or more keywords from a plurality of attributes of the matching source code file or snippets therein and/or the first software archive in which it was found.

According to one embodiment, the second set of key information comprises one or more keywords from a plurality of attributes of the matching source code snippets and/or the second software archive in which it was found.

According to one embodiment, the plurality of attributes includes at least two of the following: an author, a repository name, a filename and a resource location of the matching source code file and/or the snippets and/or the software archive in which it was found.

According to one embodiment, the plurality of first and/or second software archives originating from different sources in the global computer network are maintained in a local data repository.

In a second aspect, an apparatus for performing software composition analysis of a target source code for a computer program or a part thereof is provided. The apparatus comprises a processing device being configured for performing a first exploration process. The first exploration process comprises searching a plurality of first software archives originating from different sources in a global computer network to find first occurrences of the target source code among source code files in the plurality of first software archives. The first exploration process further comprises, for every found first occurrence of the target source code, collecting a first set of key information about matching source code files or snippets therein. The processing device is further configured for performing a second exploration process. The second exploration process comprises searching a plurality of second software archives originating from one or more sources in the global computer network, the plurality of second software archives being different from the plurality of first software archives, to find second occurrences of the target source code among source code snippets in the second software archives. The second exploration process further comprises, for every found second occurrence of the target source code, collecting a second set of key information about matching source code snippets. The processing device is further configured for mapping each matching source code snippet among the matching source code snippets as collected in the second set of key information to the matching source code files or snippets therein as collected in the first set of key information, wherein the mapping indicates whether an earlier version of said each matching source code snippet exists in the first set of key information. The processing device is further configured for, based on the mapped first set of key information and second set of key information, determining a software composition of the target source code.

According to one embodiment, the processing device is further configured for performing the functionality recited in any of the embodiments associated with the first aspect.

In a third aspect, a computer program product comprising computer program code for performing the method according to the first aspect and any of the embodiments associated therewith when the computer program code is executed by a processing device.

In a fourth aspect, a computer readable medium having stored thereon a computer program comprising computer program code for performing the method according to the first aspect and any of the embodiments associated therewith when the computer program code is executed by a processing device.

As used herein, "target source code" refers to an arbitrary piece or snippet of source code for a computer program or a part thereof, the operational stability of which is to be assessed by means of the present invention. "Computer program" accordingly refers to the computer program executing the target source code and "a part thereof" refers to instructions, libraries or related data of the computer program. "Software archives" refer to publically available open source libraries managing and storing large quantities of computer source code from a code space created and modified by a plurality of e.g. software developers, coders, enthusiasts and other professionals. Software archives typically offer distributed version control of programs and store key information of a program such as for example authors, repository names, filenames and resource locations. The software archives may be stored for online or offline access through a variety of search engines. Additionally, software archives may manage repository licenses and versions.

The provision of a computer-implemented method, apparatus, computer program product and computer readable medium as disclosed herein will solve or at least mitigate one or more of the problems or drawbacks identified in the background section of this document. These and other aspects, objectives, features and advantages of the invention and its disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

Figure 1:
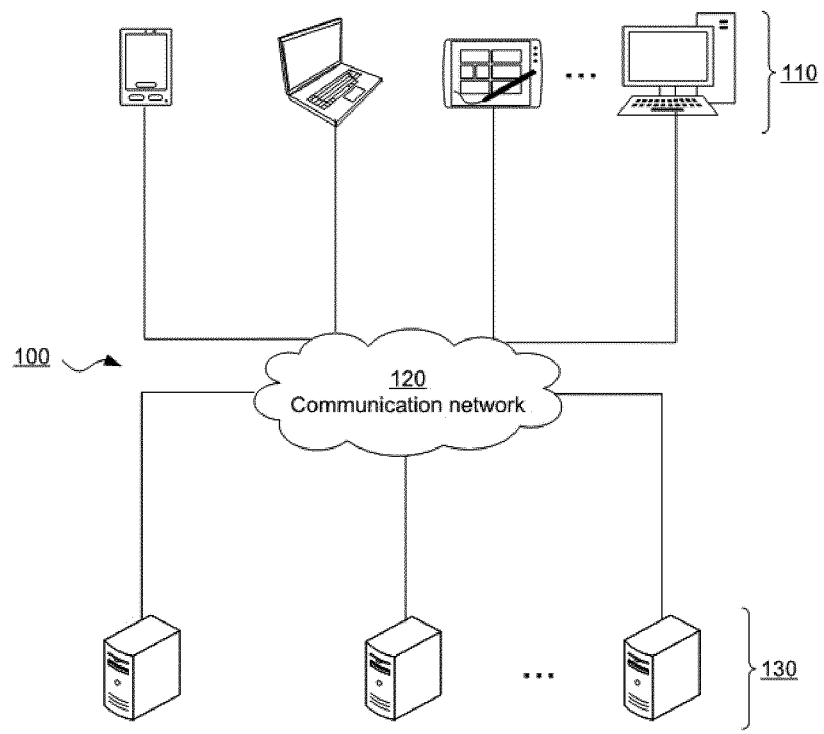
FIG. 1 illustrates various kinds of computing devices communicating with a general computer network according to one embodiment.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 illustrates a general computer network 100 that comprises various kinds of computing devices 110, 130. The computing devices include typical end-user devices 110, or client devices, such as tablet computers (e.g. surf pads), mobile terminals (e.g. smartphones or personal digital assistants), or personal computers (e.g. laptops, personal computers or workstations). The computing devices also include typical server devices 110, which may be physically separable devices, or distributed (e.g. cloud-based) computing resources, or a combination thereof.

The computing devices 110, 130 communicate by wireless and/or wired networked communication, illustrated in a simplified manner in the form of one common communication network 120. The wireless networked communication may include one or more of WIFI, Bluetooth®, W-CDMA, GSM, UTRAN, HSPA, LTE and LTE Advanced, to name a few. The wired networked communication may include one or more of USB, Ethernet or TCP/IP, to name a few. The communication network 120 may be the Internet or a part thereof.

Figure 2A:
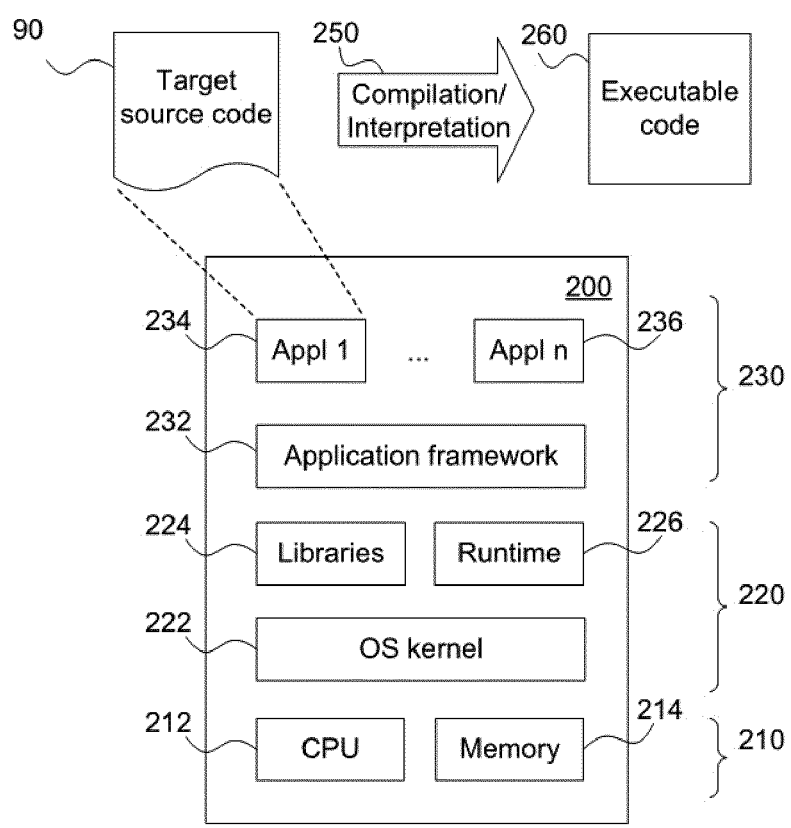
FIG. 2a is a schematic block diagram of some typical components of a general computer system according to one embodiment, for instance any of the computing devices shown in FIG. 1.

FIG. 2a is a schematic block diagram of some typical components of a general computer system 200. The computer system 200 may, for instance, be any of the types of computing devices 110, 130 shown in FIG. 1. As seen in FIG. 2a, the computer system 200 comprises a processing device 212 (or a cooperative plurality of such processing devices) and a memory 214 (or a cooperative plurality of such memories).

The processing device 212 is responsible for the overall operation of the computer system 200 and is preferably implemented by any commercially available CPU ("Central Processing Unit"), DSP ("Digital Signal Processor") or any other electronic programmable logic device. The processing device 212 is configured to read instructions from the memory 214 and execute these instructions to control the operation of the computer system 200. The memory 214 may be implemented using any commonly known technology for computer-readable memories such as ROM, RAM, SRAM, DRAM, CMOS, FLASH, DDR, EEPROM memory, flash memory, hard drive, optical storage or any combination thereof.

The processing device 212 and the memory 214 can be seen as a hardware layer 210 of the computer system 200. The computer system 200 further has a software architecture which includes an operating system layer 220 and an application program layer 230. The operating system layer 220 includes an operating system (OS) kernel 222, various code libraries 224, and a runtime 226. The application program layer 230 comprises an application framework 232 that supports various application programs 234-236. For exemplifying purposes in the present description, it is assumed that the application program 234 is the target computer program. Origins of source code being executed from the application program 234 by the processing device 212 of the computer system 200 can be determined by means of the present invention. The operating system may, for instance, be Apple OSX, Microsoft Windows, Unix, Android or Apple iOS.

The application program 234 is defined by target source code 90. As seen at 250, compilation or interpretation will generate executable code 260 from the source code. The executable code will contain sets of instructions that when executed by the processing device 212 will control the operation of the computer system 200 by performing the functionality intended by the application program 234.

Needless to say, the computer system 200 may typically comprise user interface devices (particularly when the computer system 200 is an end-user client device like 110 in FIG. 1), and communication interface devices being adapted to allow the computer system 200 to communicate with other devices through the use wired or wireless communication, for instance as described above for FIG. 1. Moreover, the components of the computer system 200 may be distributed over more than one physical device, such as in a client-server or cloud computing architecture. Accordingly, the computer system is not limited to being merely a single physical device.

Figure 2B:
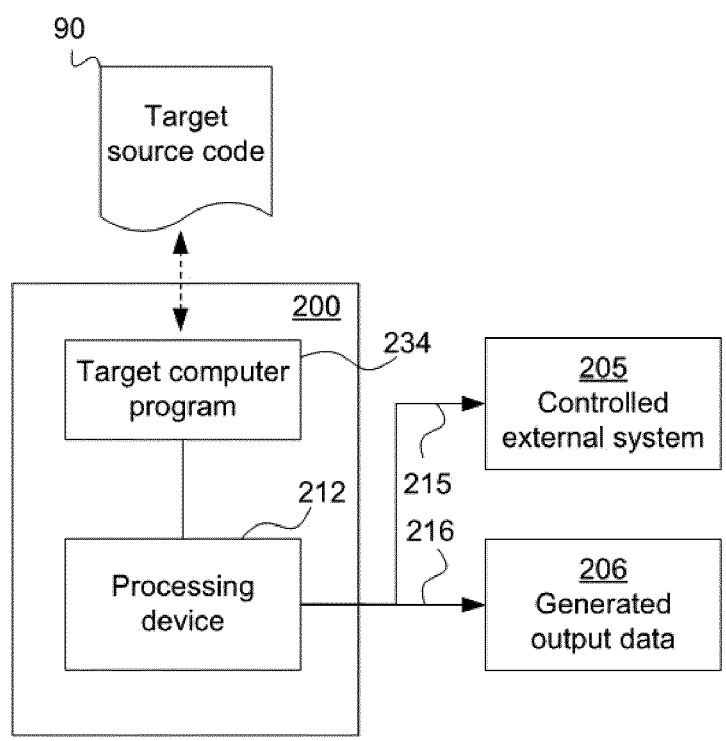
FIG. 2b is a schematic illustration of a computer system according to one embodiment, which is adapted to execute a target computer program, the target computer program having a target source code.

FIG. 2b is a schematic illustration of a computer system 200 that comprises a processing device 212 being adapted to execute a target computer program 234 having a target source code 90. One possible task of the computer system 200 when executing the target computer program 234 may be to control an external system 205 by generating control signals 215. The controlled external system 205 may, for instance, be an industrial process or plant, or technical equipment in a private home or a public building, etc. As already discussed in the background section of this document, a program's operational stability in terms of risk management, security and license compliance must be assured, so as to protect individuals, companies or enterprises from software vulnerabilities and license violation liabilities. This requires the target computer program 234 to perform the intended functionality without malfunctions, bugs or malicious activity, i.e. to have operational stability. Since it is the target source code 90 that defines the target computer program 234 and therefore in effect controls the behavior of the computer system 200, the target source code 90 must contain the correct computer program code instructions and nothing else. As was explained in the background section, however, the target source code 90 can exist and operate in a multitude of different languages, formats, syntaxes, semantics, varieties and types. Moreover, the target source code 90 can exist on variety of different platforms such as Internet-driven community-based platforms or open source code platform. Accurate and fast software composition analysis of the target source code 90 is therefore very important.

Another possible task of the computer system 200 when executing the target computer program 234 may be to generate output data 206 by generating control signals 216. The output data may represent key information for use by other technical systems or human readers. For similar reasons as were given above, it is typically important that the generated output data 206 is correct and free from errors. Again, the target computer program 234 should perform the intended functionality without malfunctions, bugs or malicious activity, i.e. have operational stability.

Figure 2C:
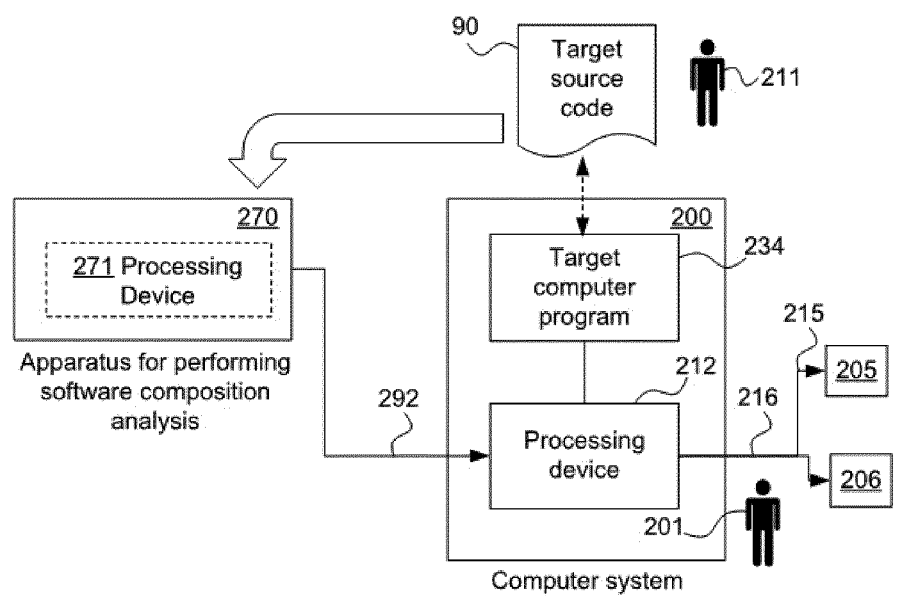
FIGS. 2c-d are schematic illustrations of embodiments of an apparatus for performing software composition analysis of a target source code for a computer program or a part thereof, for instance the computer system in FIG. 2b.

FIG. 2c is a schematic illustration of an apparatus 270 for performing software composition analysis of a target source code 90 for a computer program or a part thereof. The apparatus 270 comprises a processing device 271 which is configured for performing functionality of a computer-implemented method 400. The method 400 is illustrated in more detail as a flowchart diagram in FIG. 5.

In some embodiments, the processing device 271 of the apparatus 270 is implemented by customized hardware (such as, for instance, an ASIC or FPGA). In other embodiments it may be implemented by a general-purpose processor (such as, for instance, a CPU or DSP) being programmed by software customized to perform the functionality of the method 400 as described herein.

Figure 5:
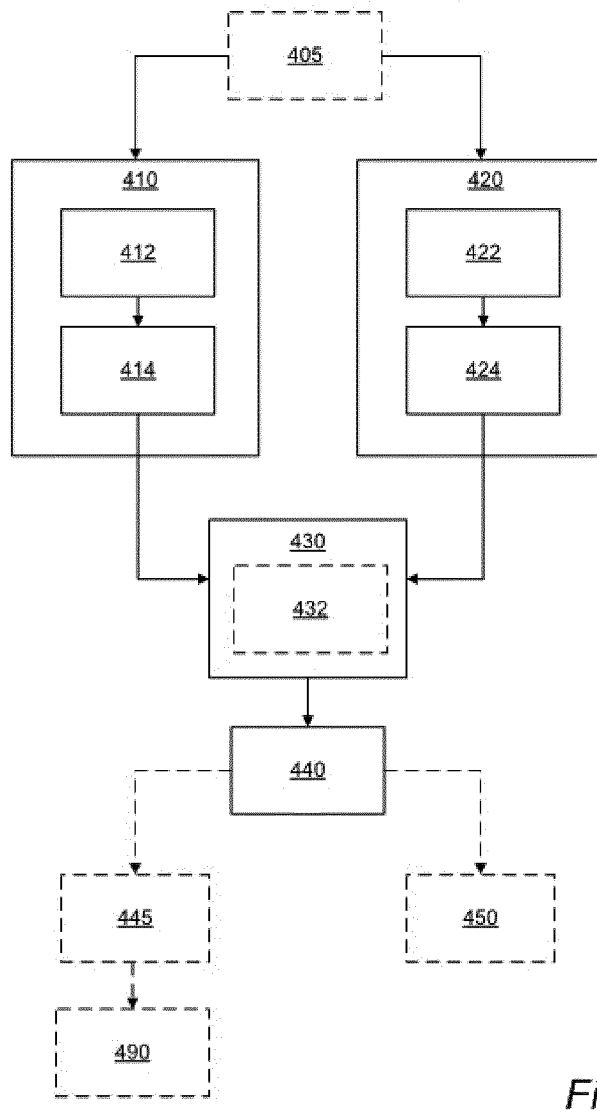
FIG. 5 is a flowchart diagram that illustrates a computer-implemented method according to one embodiment, for performing software composition analysis of a computer program or a part thereof.

The processing device 271 takes the target source code 90 as input and determines a software composition of the target source code 90 for the computer program 234 in accordance with the computer-implemented method 400 in FIG. 5, a detailed explanation of which will follow in subsequent passages of this document.

After the processing device 271 of the apparatus 270 has performed software composition analysis of the target source code 90, the processing device 271 may deliver one or more output signals 292, being indicative of determined software composition of the target source code 90, to the computer system 200. These output signal(s) 292 will further be described with reference to FIG. 3.

Figure 2D:
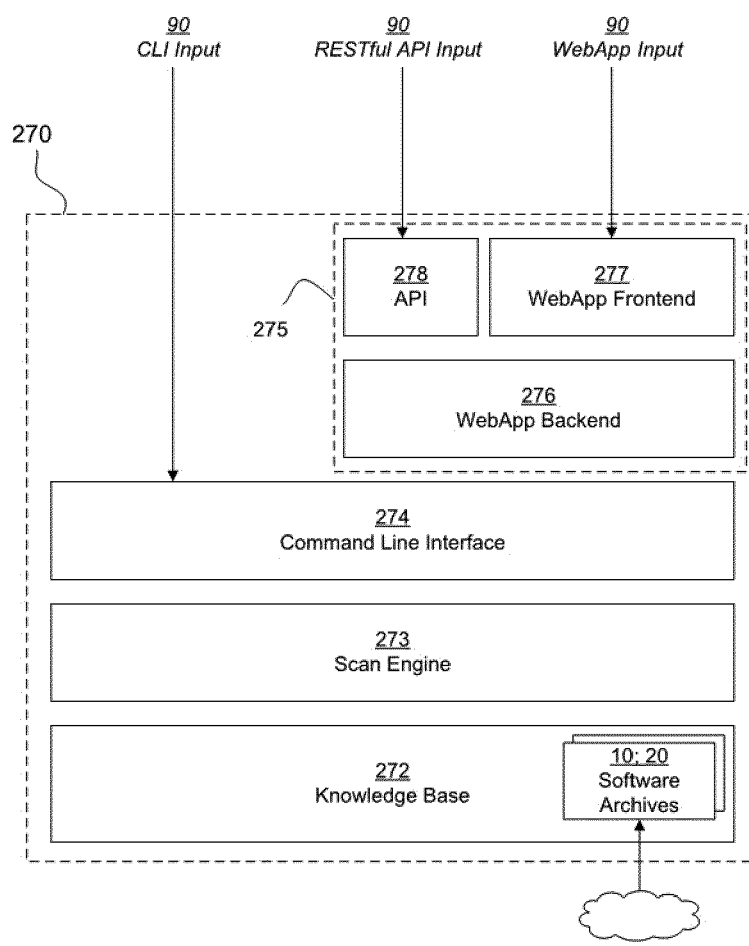

FIG. 2d is a schematic illustration of the apparatus 270 according to one embodiment. The apparatus 270 is adapted to carry out software composition analysis of a target source code 90. The apparatus 270 comprises a knowledge base 272 having a plurality of software archives 10; 20, a scan engine 273, a command line interface 274 and a web application 275 having a backend 276, a frontend 277 and an associated Application Programming Interface (API) 278. The apparatus 270 is configured to receive target source code 90 input through one or more different input sources. For instance, the apparatus 270 may be configured to receive target source code 90 as any or a combination of WebApp inputs, RESTful API inputs, or command line interface input. In one embodiment, the web application 275 is directly manipulated by a user of the apparatus 270. Such manipulations may e.g. involve interacting with a graphical user interface (GUI) for directly entering a target source code 90 subject to software composition analysis therein. For instance, a manipulation may involve that the user transmits a request for performing software composition analysis of the target source code 90. The request may involve setting a number of technical parameters separated by some delimiter, that is relevant to the search. Such parameters may involve e.g. search space, confidence intervals, and/or search times (maximum or minimum). After the analysis has been completed, the web application 275 may be configured to illustrate the results of the analysis in the GUI associated with the frontend 277. The frontend 277 may further be manipulated so that results can be filtered or hidden. Alternatively, or additionally, the frontend 277 may further visualize information associated with either one of the target source code 90, the performance of the software composition analysis, or the results of the analysis. For instance, the user may select to be directed to a resource location of components comprised in the target source code 90, once the analysis has been finished. The resource location may for instance comprise a path to where the resource resides in public or private clouds, branch offices, data storages, data centers or other virtual locations.

The skilled person may realize a wide variety of additional manipulations and/or visualizations associated with the web application 275, all of which can be implemented by the apparatus 270 generally according to the embodiment as illustrated in FIG. 2d.

The scan engine 273 is configured to perform a set of exploration processes upon the target source code 90 with respect to the knowledge base 272. Although not explicitly shown in the figure, the scan engine 273 comprises a processing device 212; 271 which is based on processing device technologies which has been previously described in this disclosure. The scan engine 273 is capable of searching through a large number of files, snippets, instructions, libraries, etc., every time unit, to carry out very efficient and accurate searches.

In one embodiment, the scan engine 273 comprises an AI-powered device (not shown) which may be designed to carry out at least a part of each exploration process. The AI-powered device may for instance assist the scan engine 273 with eliminating false positives, or in some manner improve the accuracy or efficiency of the scan. In one embodiment, the AI-powered device is implementing a self-learning system that generates intelligent predictions regarding false positive data as has been acquired during previously performed scans. Such predictions may further improve the performance of the scan engine 273 by e.g. omitting one or more search files or snippets or managing what data archives are being analysed. The AI-powered device thus assists the scan engine 273 in generating autonomous decisions based on previously performed scans in order to improve the general performance of subsequent scans. In different embodiments of the scan engine 273, supervised and/or unsupervised learning algorithms may be implemented and/or applied, such as for example regression algorithms, decision trees, K-means, K-nearest neighbours, neural networks, support vector machines or principal component analyses.

The knowledge base 272 is designed as a storage location for data, including but not limited to one or more repositories, databases, distributes ledgers or data centers. The knowledge base 272 may be maintained locally or on a cloud service. Such cloud services may be based on technologies such as Amazon Web Services, Google Cloud Platform, Microsoft Azure, DigitalOcean, IBM Bluemix or Alibaba Cloud, to name a few. Scans to the knowledge base 272 may be performed online or offline, meaning that the scans are not necessarily requiring access to the Internet. In these cases, the data maintained in the knowledge base 272 have been harvested from a network, such as the global computer network 100 explained in FIG. 1, prior to the actual scan process. In a preferred embodiment, the knowledge base 272 is configured to store a plurality of first and second software archives 10; 20, wherein said archives 10; 20 originates from different sources in the global computer network 100. This will now be explained with reference to FIG. 3.

Figure 3:
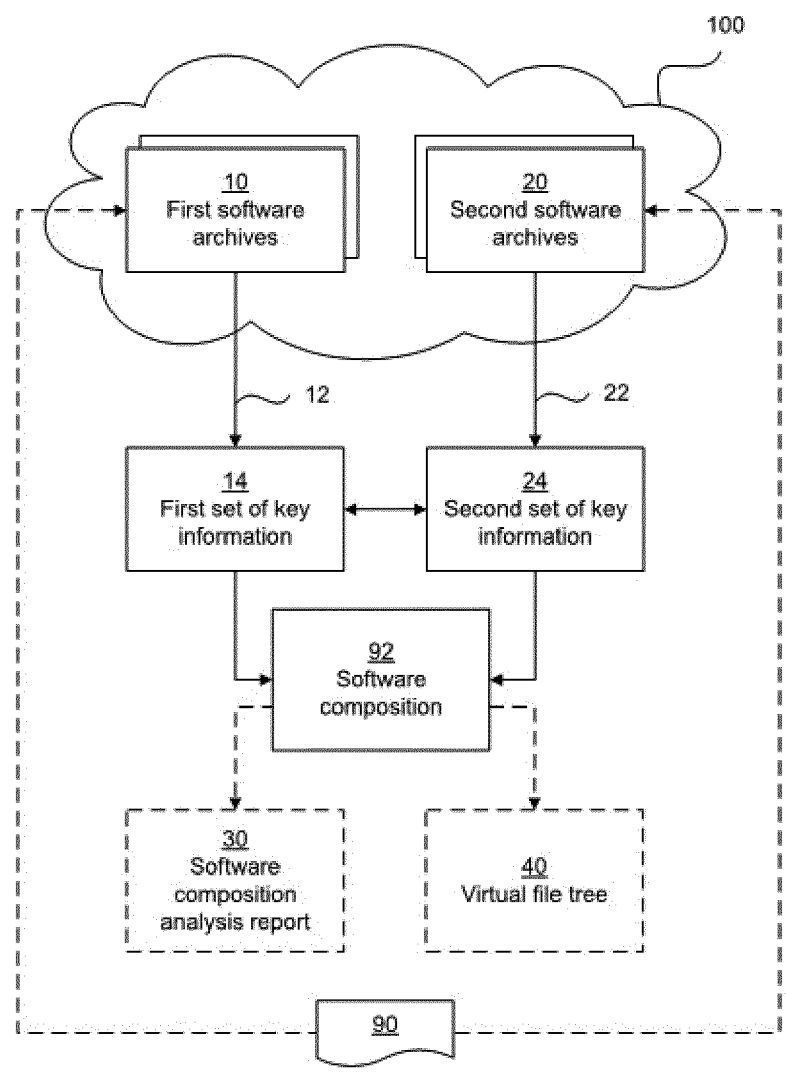
FIG. 3 is a schematic illustration of how software composition analysis can be performed according to one embodiment.

FIG. 3 illustrates software composition analysis of a target source code 90 according to one general embodiment. The target source code 90 typically comprises one or more code files, code pieces or code snippets, and is generally used for a computer program or a part thereof.

The software composition analysis may involve several steps, processes and/or analyses, wherein some of the most important ones are shown in FIG. 3. The dashed lines are to be interpreted as having an optional character in the software composition analysis, and is not to be interpreted as a scope restriction. The software composition analysis is, however, by no means limited to the embodiment as illustrated and explained with reference to FIG. 3. As the skilled person will realize, additional or fewer associated steps may be involved.

The software composition analysis comprises two different exploration processes, each process having an objective of producing a first set of key information 14 and a second set of key information 24, respectively. The exploration processes may be performed one at a time, in a sequence, by a single processing device such as the ones previously described (212 and 271). Alternatively, the exploration processes are performed in parallel and run on commonly known cloud-computing platforms such as e.g. Amazon Web Services, Google Cloud Platform, Microsoft Azure, DigitalOcean, IBM Bluemix or Alibaba Cloud. The exploration processes generally involve searching for occurrences 12; 22 of the target source code 90 among source code files or snippets in a plurality of first and second software archives 10; 20, respectively.

The plurality of first and/or second software archives 10; 20 originate from different sources in a global computer network 100, being indicated by a cloud in the figure. It does, however, not mean that the occurrences are derived directly (e.g. retrieved in in real time) from the global computer network 100. The plurality of first and/or second software archives 10; 20 have typically been harvested, analysed, processed, indexed, and stored in the knowledge base 272 of the apparatus 270 before the software composition analysis is performed on the target source code 90. The harvesting of information may be based on massive web crawling on a large number of websites to retrieve the relevant information.

In FIG. 3, the plurality of first and second software archives 10; 20 are depicted as being different from one another, but originating from the same global computer network 100 (such as the Internet). A fundamental difference between contents of the plurality of first software archives 10 and the plurality of the second software archives 20 is that the first archives 10 are open source code archives. The open source code archives can be one of or a combination of e.g. Github, Gitlab, or Bitbucket archives. As is well known, open source code archives as the ones mentioned comprise a significant amount of stored data. The data stored therein are typically computer programs, instructions, libraries or related data of the computer program, including complete files as well as code snippets within said files. The second archives 20, on the other hand, are Internet-based community-driven platform archives. Such community-driven platform archives may, for instance, be one or a combination of StackOverflow or other StackExchange platforms, Coderanch, Quora, Reddit, Google Groups, SitePoint, CodeProject, Google+Communities, Treehouse, Hacker News, DZone, Bytes, DaniWeb, Dream.In.Code, Pineapple, Lobsters, XDA Developers, CodeGuru, Programmers Heaven, FindNerd, Designers Talk, Hashnode or Mozzila Web Developer Community archives. Such platforms are typically used as Q&A forums for users to share code, help each other solve problems, and conduct code discussions. As a result, a plurality of original code snippets is constantly being produced and linked to different authors on one or more platforms. In some embodiments, the plurality of first and/or second software archives 10; 20 are any combination of open source code archives or Internet-based community-driven platform archives, e.g. hybrid archives.

The software composition analysis further involves mapping the first and second sets of key information 14; 24 with one another, to determine a software composition 92 of the target source code 90. The software composition 92 may be indicative of origins, licenses, versions, vulnerabilities, comments, repositories, authors, file sizes, snippet sizes and/or resource locations associated with the target source code 90. For instance, the software composition 92 may be indicative of vulnerabilities listed in the Official Common Platform Enumeration Dictionary (CPE) by the National Vulnerability Database (NVD), for every single search hit. Information derived from the software composition 92 will ideally assist in assessing operational stability of the target source code 90.

The fundamental inventive concepts of how the plurality of first and/or second software archives 10, 20 are collected, and how the first and second sets of key information 14; 24 are mapped, will be explained in further detail with reference to FIG. 4.

Shown in FIG. 3 are also two optional steps of providing a software composition analysis report 30 or a visual file tree 40, which are based on the software composition 92 of the target source code 90. The software composition analysis report 30 is a report of the software composition 92 that has been comprehensively generated and involves all of the necessary information related to the software composition 92 of the target source code 90. The report 30 may be transmitted directly to one or more users associated with the analysis. Alternatively, or additionally, the report 30 may be uploaded to a website, or distributed using social media applications or programs of users' selection. The virtual file tree 40 is a graphical view which may be viewed on e.g. the web application 275 as explained with reference to FIG. 2*d*. The virtual file tree 40 may comprise information on how the search hits are related to each other, and arranged in a file tree on one or more monitors.

Figure 4A:
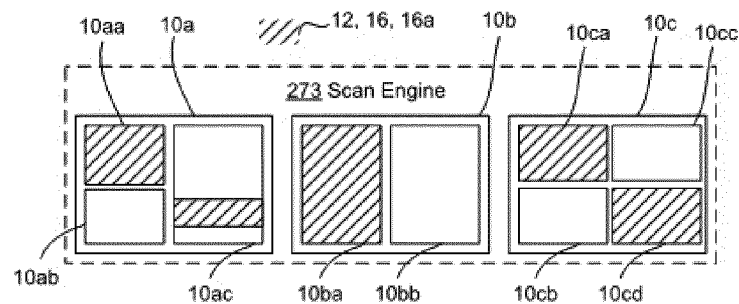
FIGS. 4a-c are schematic illustrations of how software composition analysis can be performed according to one embodiment.
Figure 4B:
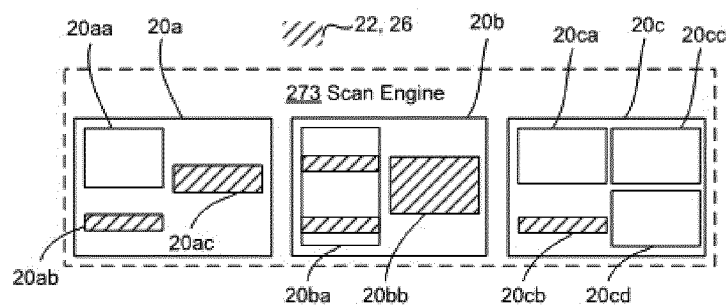
Figure 4C:
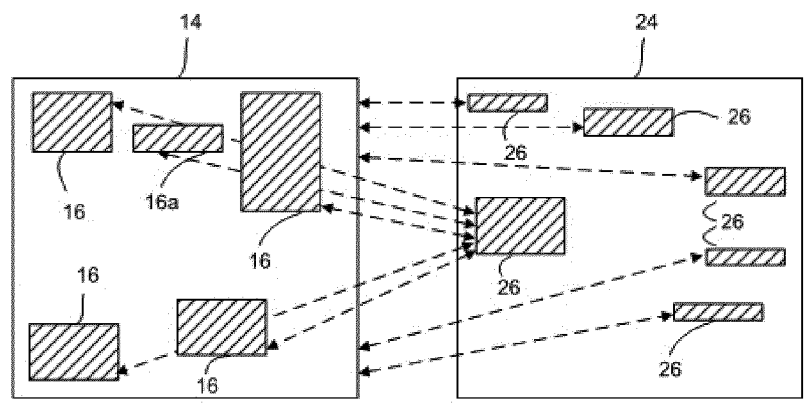

With reference to FIGS. 4*a-c*, an example of a software composition analysis will be described.

FIG. 4*a* illustrates a first exploration process according to one embodiment. The plurality of first software archives 10 is being searched by the scan engine 273 in order to find first occurrences 12 associated with a target source code 90 (not shown in the figure). For simplicity reasons in the illustrative figure, a total of three (3) first software archives 10*a-c* are being searched, and these archives 10*a-c* comprise, from left to right, three source code files 10*aa*-10*ac*, two source code files 10*ba*-10*bb*, and four source code files 10*ca*-10*cd*, respectively. Clearly, in practical examples, ideally as many files as possible, being spread across a large number of different first archives 10, would be searched.

In FIG. 4*a*, the first exploration process has yielded five found occurrences 12 of the target source code 90 among the first software archives 10*a-c*, which in the figure are indicated by striped patterns. It can be understood from the figure that four out of five found occurrences 12 correspond to matching source code files 16, as the entire files are striped (see 10*aa*, 10*ba*, 10*ca* and 10*cd*). One of the occurrences 12, however, corresponds to a snippet 16*a* within a source code file 16. This is indicated by the source code file 10*ac*, as it only has a section thereof striped. Hence, the found occurrences 12 are either matching source code files 16 or snippets 16*a* therein. If a source code file is found, the search is no longer performed for the snippets within that file. Hence, in the provided example, the snippets within the four source code files 10*aa*, 10*ba*, 10*ca* and 10*cd* are not further searched. This is because the first software archives 10 are open source code archives that contain so much data that it would be very time-consuming, if not impossible, to find every single occurrence 12 within said files 10*aa*-10*cd*. Some files 10*aa*-10*cd* have very large sizes, and it would not be feasible from a usability point-of-view to perform one single software composition analysis of a target source code 90 on every snippet within such large files.

FIG. 4*b* illustrates a second exploration process according to one embodiment. The plurality of second software archives 20 originating from one or more sources in the global computer network 100 are being searched in order to find second occurrences 22 associated with a target source code 90 (not shown in the figure). Compared to the first exploration process, the second exploration process only searches for second occurrences 22 among source code snippets, as opposed to source code files. This is due to the nature of the plurality of second software archives 20 being Internet-based community-driven platform archives. In general, such archives 20 are based on users helping each other to solve problems online. Consequently, users seldom post entire source code files, but instead snippets of code. Similarly to source code files, however, these snippets may also be associated with vulnerabilities, licenses and/or compliance issues of different types that will be included in software composition analysis of target source code 90. For simplicity reasons in the illustrative drawing, a total of three (3) second software archives 20*a-c* are being searched by the scan engine 273, and these archives 20*a-c* comprise, from left to right, three snippets 20*aa*-20*ac*, two snippets 20*ba*-20*bb*, and four snippets 20*ca*-20*cd*, respectively. Clearly, in practical examples, ideally as many snippets as possible spread across a plurality of different second archives 20 would be searched.

In FIG. 4*b*, the second exploration process has yielded six found second occurrences 22 of the target source code 90 among the second software archives 20*a-c*, which in the figure are indicated by a striped pattern. It can be understood from the figure that all occurrences 22 correspond to matching source code snippets 26. Snippets as used throughout this disclosure is not restricted to a particular size, and it may comprise one or more lines of code. Hence, multiple found second occurrences 22 may be found within the same snippet. An example of this is illustrated in snippet 10*ba*, which has two striped sections indicating that there are two found second occurrences within said snippet.

Now that the two exploration processes have been explained with reference to FIGS. 4*a* and 4*b*, reference will be made to FIG. 4*c*.

For every found first occurrence 12 of the target source code 90, a first set of key information 14 about matching source code files 16 or snippets therein 16*a* is collected. Moreover, for every found second occurrence 22 of the target source code 90, a second set of key information 24 about matching source code snippets 26 is collected. The first and second sets of key information 14; 24 are shown in FIG. 4*c*.

In one embodiment, the first set of key information 14 comprises one or more keywords from a plurality of attributes associated with the matching source code file 16 or snippets 16*a* therein. Additionally or alternatively, the plurality of attributes may be associated with the first software archive 10 in which the matching source code file 16 or snippets therein 16*a* was found.

In one embodiment, the second set of key information 24 comprises one or more keywords from a plurality of attributes associated with the matching source code snippet 26. Additionally or alternatively, the plurality of attributes may be associated with the second software archive 20 in which the matching source code snippet 26 was found.

In one embodiment, for both the first and second sets of key information 14; 24, the plurality of attributes may include at least two of the following: an author, a repository name, a filename and a resource location of the matching source code file 16 and/or the snippets 16*a*; 26 and/or the software archive 10; 20 in which it was found.

In one embodiment, each matching source code file 16 or snippet therein 16*a*, or source code snippet 26, has been arranged and organized within its respective set of key information 14; 24 so that subsequent steps can be performed efficiently. For instance, the matches may be sorted according to a predetermined set of instructions, e.g. by sizes, dates, versions, and so forth. In another embodiment, the sets 14; 24 are not arranged at all, or just partly arranged, so that time is not spent on arranging or organizing the matches.

As shown in FIG. 4*c*, the next step of the software composition analysis involves a mapping of matches between the two sets 14; 24. The mapping indicates whether an earlier version of each code snippet 26 in the second set of key information 24 exists in the first set of key information 14.

"An earlier version" can be understood as a source code snippet 16*a*; 26 that was originally produced and made available in the plurality of first software archives 10, and at a later point in time, once again, made available in the plurality of second software archives 20. Consequently, the second set of key information 24 comprises a version of the original source code snippet 16*a*; 26, wherein an earlier version thereof is also comprised in the first set of key information 14. If the source code snippet 16*a*; 26 was made available on multiple archives among the plurality of first archives 10, and similarly, on multiple archives among the plurality of second archives 10, all of these version would be collected in their respective sets 14, 24. Hence, a complete mapping of all existing versions of the source code snippets 16a; 26 in both sets 14, 24 is performed.

Source code snippets 16a; 26 that are made available in the plurality of first and/or second archives 10; 20 are typically marked with some type of timestamp, e.g. a sequence of characters or encoded information. The timestamps are indicative of when the source code snippet 16a; 26 was made available, by e.g. referencing a time and date. To perform the mapping, these timestamps may be collected together with the source code snippets 16a; 26 in their respective sets 14; 24.

Different versions of the same source code snippet 16a; 26 should not necessarily be interpreted as an exact copy of the original version. Slight deviations of different versions may also be detected, if the deviation is made in such a way that it is clearly a reproduction of the original version of the source code snippet 16a; 26. For instance, such deviations may involve syntactic, lexical or semantic deviations. In order to detect these deviations, different techniques known in the art of plagiarism detection may be applied. Plagiarism detection techniques may involve e.g. machine learning algorithms including but not limited to support vector machines or k-NN.

The mapping is of particular importance in the software composition analysis as disclosed herein. Because of the nature of open source, it can be very difficult to derive the origin of snippets 26 that are retrieved from Internet-based community-driven platform without performing the mapping to open source archives. Source code that is collected from online platforms tends to originate from open source archives, due to users copy-pasting said source code to help other users. Hence, the source code is typically posted on such platforms at a later stage. As a consequence, without the mapping, a software composition analysis approach that includes both open source archives and online platforms would be infeasible, since there would exist a plurality of false positives within the collected matches in the second set of key information 24. In the embodiment of FIG. 4c, each matching source code snippet 26 from the second set of key information 24 has therefore been mapped to the matching source code files 16 or snippets therein 16a as collected in the first set of key information 14. The dashed arrows in the figure indicate this. The dashed arrows that are visualized from each matching source code snippet 26 in the second set 24 are mapped in a similar manner as the larger snippet 26 being depicted in the middle.

In one embodiment, the mapping may involve filtering the matching source code snippets 26 from the second set of key information 24. Such filtering may in different embodiments involve either one or a combination of discarding, removing, hiding and down ranking the matching source code snippets 26 from or in the second set of key information. The filtering may be performed differently based on a number of factors. The factors include, for instance, user preferences, security settings, type of search results or discovered vulnerabilities.

Based on the mapped sets 14; 24, a software composition 92 of the target source code 90 can be determined. The software composition 92 may be provided to a user according to techniques that has been previously described throughout this disclosure, such as e.g. a report 30 or a virtual file tree 40.

FIG. 5 is a flowchart diagram that illustrates an embodiment of a computer-implemented method 400 for performing software composition analysis of a target source code 90. The target source code 90 is associated with a computer program or a part thereof. The method 400 involves several steps, processes or parts, that are to be performed by a computerized machine, such as the apparatus 270 that has been described previously in this document. The steps being indicated with dashed arrows and squares can be interpreted as being more of an optional character, whereas the solid arrows and squares can be seen as preferred embodiments of the method 400.

The method 400 may involve a first step of receiving 405 a request for performing software composition analysis of the target source code 90. A user or a machine, which is requesting target source code 90 to be analysed, may perform this step automatically or manually. The request may be received on a timely or adhoc basis, or any combination thereof. Receiving 405 a request may involve receiving one or more parameters associated with said request, such as a selected search space, confidence intervals, and/or search times (maximum or minimum). These parameters may undergo one or more processing steps, so that the parameters can be interpreted. These steps may include e.g. preprocessing, filtering, or removing certain characters.

The method 400 further involves performing 410 a first exploration process, as well as performing 420 a second exploration process. Each of the exploration processes comprises associated steps of searching 412; 422 and collecting 414; 424 relevant information. The exploration processes are to be performed generally according to the inventive aspects as disclosed with reference to FIGS. 3 and 4a-c, and as a result collect a first set of key information from open source archives, and a second set of key information from Internet-based community-driven platforms.

When the exploration processes have been performed, the method 400 further involves a step of mapping 430 the two collected sets with one another. The mapping 430 may involve a step of filtering the second set of key information according to the inventive concepts as demonstrated with reference to FIG. 4c, i.e. to discard, remove, hide, etc., those source code snippets from the second set of key information that match an earlier version of the snippet in the first set of key information.

Further, the method 400 involves a step of determining 440 a software composition 92 of the target source code 90, based on the mapping 430.

Finally, and optionally, the software composition 92 may be transmitted to one or more users using any known communication techniques as previously discussed. In one embodiment, the software composition 92 is compiled 445 into a software composition analysis report 30 comprising the relevant information, and subsequently returned 490 to a user. In an alternative embodiment, a virtual file tree 40 is created 40 of the software composition 92 of the target source code 90.

Figure 6:
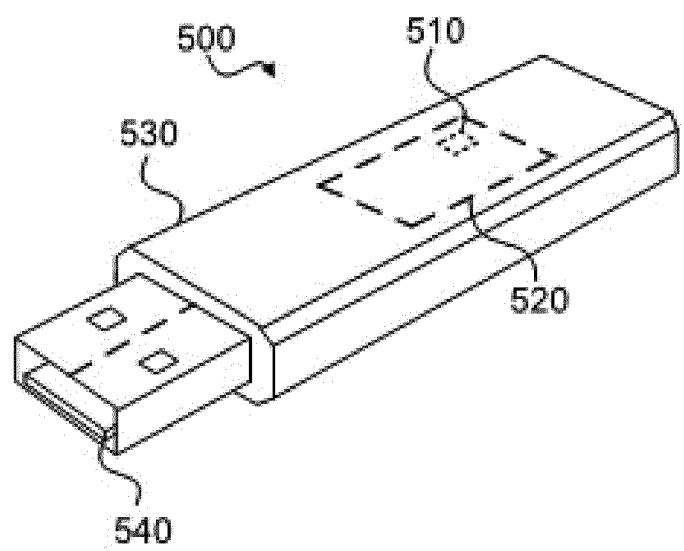
FIG. 6 is a schematic illustration of a computer-readable medium in one exemplary embodiment, capable of storing a computer program product.

FIG. 6 is a schematic illustration of a computer-readable medium 500 in one exemplary embodiment, capable of storing a computer program product 510. The computer-readable medium 500 in the disclosed embodiment is a memory stick, such as a Universal Serial Bus (USB) stick. The USB stick 500 comprises a housing 530 having an interface, such as a connector 540, and a memory chip 520. In the disclosed embodiment, the memory chip 520 is a flash memory, i.e. a non-volatile data storage that can be electrically erased and re-programmed. The memory chip 520 stores the computer program product 510 which is programmed with computer program code (instructions) that when loaded into a processing device, such as the processing device 212 or 271 as described above, will perform a method 400 according to any or all of the embodiments disclosed above. The USB stick 500 is arranged to be connected to and read by a reading device for loading the instructions into the processing device. It should be noted that a computer-readable medium can also be other mediums such as compact discs, digital video discs, hard drives or other memory technologies commonly used. The computer program code (instructions) can also be downloaded from the computer-readable medium via a wireless interface to be loaded into the processing device.

References to a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has been described above in detail with reference to embodiments thereof. However, as is readily understood by those skilled in the art, other embodiments are equally possible within the scope of the present invention, as defined by the appended claims.

The invention claimed is:

1. A computer-implemented method for performing software composition analysis of a target source code for a computer program or a part thereof to determine an origin associated with the target source code, the method involving:
    performing a first exploration process, comprising:
        searching a plurality of first software archives to find first occurrences of the target source code among source code files in the plurality of first software archives, wherein the plurality of first software archives are open source code archives originating from different sources in a global computer network, and
        for every found first occurrence of the target source code, collecting a first set of key information about matching source code files or snippets therein; performing a second exploration process, comprising:
        searching a plurality of second software archives originating from one or more sources in the global computer network, the plurality of second software archives being (i) different from the plurality of first software archives and (ii) Internet-based community-driven platform archives, to find second occurrences of the target source code among source code snippets in the second software archives, and
        for every found second occurrence of the target source code, collecting a second set of key information about matching source code snippets;
    mapping each matching source code snippet among the matching source code snippets as collected in the second set of key information to the matching source code files or snippets therein as collected in the first set of key information, wherein the mapping indicates whether an earlier version of said each matching source code snippet exists in the first set of key information; and
    based on the mapped first set of key information and second set of key information, determining a software composition of the target source code, where the determined software composition indicates the origin associated with the target source code.

2. The computer-implemented method according to claim 1, wherein if an earlier version of said matching source code snippet exists in the first set of key information, the mapping further involves filtering said matching source code snippet from the second set of key information.

3. The computer-implemented method according to claim 2, wherein the filtering involves discarding, removing, hiding and/or down ranking said matching source code snippet from or in the second set of key information.

4. The computer-implemented method according to claim 1, wherein the software composition is indicative of licenses, versions, vulnerabilities, comments, repositories, authors, file sizes, snippet sizes and/or resource locations associated with the target source code.

5. The computer-implemented method according to claim 1, wherein the open source code archives are one of or a combination of Github, Gitlab, or Bitbucket archives.

6. The computer-implemented method according to claim 1, wherein the Internet-based community-driven platform archives are one of or a combination of StackOverflow or other StackExchange platforms, Coderanch, Quora, Reddit, Google Groups, SitePoint, CodeProject, Google+Communities, Treehouse, Hacker News, DZone, Bytes, DaniWeb, Dream.In.Code, Pineapple, Lobsters, XDA Developers, CodeGuru, Programmers Heaven, FindNerd, Designers Talk, Hashnode or Mozzila Web Developer Community archives.

7. The computer-implemented method according to claim 1, wherein the method further involves creating a virtual file tree of the software composition of the target source code.

8. The computer-implemented method according to claim 1, wherein the method further involves an initial step of receiving a request for performing software composition analysis of the target source code.

9. The computer-implemented method according to claim 1, wherein the method further involves compiling the software composition into a software composition analysis report, and returning said report.

10. The computer-implemented method according to claim 1, wherein the first set of key information comprises one or more keywords from a plurality of attributes of the matching source code file or snippets therein and/or the first software archive in which it was found.

11. The computer-implemented method according to claim 1, wherein the second set of key information comprises one or more keywords from a plurality of attributes of the matching source code snippets and/or the second software archive in which it was found.

12. The computer-implemented method according to claim 11, wherein the plurality of attributes includes at least two of the following: an author, a repository name, a filename and a resource location of the matching source code file and/or the snippets and/or the software archive in which it was found.

13. The computer-implemented method according to claim 1, wherein the plurality of first and/or second software archives originating from different sources in the global computer network are maintained in a local data repository.

14. An apparatus for performing software composition analysis of a target source code for a computer program or a part thereof to determine an origin associated with the target source code, the apparatus comprising a processing device being configured for:

performing a first exploration process, comprising:

searching a plurality of first software archives to find first occurrences of the target source code among source code files in the plurality of first software archives, wherein the plurality of first software archives are open source code archives from different sources in a global computer network, and for every found first occurrence of the target source code, collecting a first set of key information about matching source code files or snippets therein; performing a second exploration process, comprising:

searching a plurality of second software archives from different sources in the global computer network, the plurality of second software archives being (i) different from the plurality of first software archives and (ii) Internet-based community-drive platform archives, to find second occurrences of the target source code among snippets in the second software archives, and for every found second occurrence of the target source code, collecting a second set of key information about matching source code snippets;

mapping each matching source code snippet among the matching source code snippets as collected in the second set of key information to the matching source code files or snippets therein as collected in the first set of key information, wherein the mapping indicates whether an earlier version of said each matching source code snippet exists in the first set of key information; and based on the mapped first set of key information and second set of key information, determining a software composition of the target source code, where the determined software composition indicates the origin associated with the target source code.

15. The apparatus as defined in claim 14, wherein if an earlier version of said matching source code snippet exists in the first set of key information, the mapping further involves filtering said matching source code snippet from the second set of key information.

16. A computer program product for performing software composition analysis of a target source code for a computer program or a part thereof to determine an origin associated with the target source code, the computer program product executed by a server in communication across a network with one or more clients and comprising:

a non-transitory computer readable storage medium, the non-transitory computer readable storage medium having stored thereon program instructions, which, when executed by one or more processors, causes the one or more processors to:

perform a first exploration process, comprising:

searching a plurality of first software archives to find first occurrences of the target source code among source code files in the plurality of first software archives, wherein the plurality of first software archives are open source code archives originating from different sources in a global computer network, and for every found first occurrence of the target source code, collecting a first set of key information about matching source code files or snippets therein;

perform a second exploration process, comprising:

searching a plurality of second software archives originating from one or more sources in the global computer network, the plurality of second software archives being (i) different from the plurality of first software archives and (ii) Internet-based community-driven platform archives, to find second occurrences of the target source code among source code snippets in the second software archives, and for every found second occurrence of the target source code, collecting a second set of key information about matching source code snippets;

map each matching source code snippet among the matching source code snippets as collected in the second set of key information to the matching source code files or snippets therein as collected in the first set of key information, wherein the mapping indicates whether an earlier version of said each matching source code snippet exists in the first set of key information; and based on the mapped first set of key information and second set of key information, determine a software composition of the target source code, where the determined software composition indicates the origin associated with the target source code.

17. A non-transitory computer readable storage medium having stored thereon a computer program comprising computer program code for performing the method according to claim 1 when the computer program code is executed by a processing device.

* * * * *

UNITED STATES PATENT AND TRADEMARK OFFICE
CERTIFICATE OF CORRECTION

PATENT NO. : 12,282,766 B2  
APPLICATION NO. : 18/282486  
DATED : April 22, 2025  
INVENTOR(S) : Jon Aldama and Daniel Åkerud Page 1 of 1

It is certified that error appears in the above-identified patent and that said Letters Patent is hereby corrected as shown below:

On the Title Page

In Item (73) Assignee:  
Delete "Snyk Sweded AB, Stockholm (SE)" and insert -- Snyk Sweden AB, Stockholm (SE) --.

Signed and Sealed this  
Tenth Day of June, 2025

Coke Morgan Stewart  
*Acting Director of the United States Patent and Trademark Office*